US008826158B1

(12) United States Patent
Blair et al.

(10) Patent No.: US 8,826,158 B1
(45) Date of Patent: Sep. 2, 2014

(54) DEVICE FOR AND METHOD OF DETERMINING CHANGES TO GUI

(75) Inventors: Mark W. Blair, Columbia, MD (US); Paul J. Nuzzi, Ellicott City, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 415 days.

(21) Appl. No.: 13/374,643

(22) Filed: Dec. 14, 2011

(51) Int. Cl.
*G06F 3/048* (2013.01)

(52) U.S. Cl.
USPC .......................................... 715/762; 715/744

(58) Field of Classification Search
CPC combination set(s) only.
See application file for complete search history.

(56) References Cited

U.S. PATENT DOCUMENTS

| | | | | |
|---|---|---|---|---|
| 5,884,072 A | * | 3/1999 | Rasmussen | 709/223 |
| 6,208,336 B1 | * | 3/2001 | Carter | 715/866 |
| 6,215,488 B1 | * | 4/2001 | Bloem et al. | 715/762 |
| 6,754,885 B1 | * | 6/2004 | Dardinski et al. | 717/113 |
| 6,865,428 B2 | * | 3/2005 | Gonzales et al. | 700/86 |
| 6,898,764 B2 | | 5/2005 | Kemp | |
| 7,237,204 B2 | | 6/2007 | Kasper, II | |
| 7,415,484 B1 | * | 8/2008 | Tulkoff et al. | 1/1 |
| 7,681,138 B2 | * | 3/2010 | Grasser et al. | 715/763 |
| 7,882,441 B2 | * | 2/2011 | Alderson | 715/746 |
| 7,904,821 B1 | * | 3/2011 | Tertitski et al. | 715/762 |
| 2003/0061482 A1 | * | 3/2003 | Emmerichs | 713/165 |
| 2003/0159129 A1 | * | 8/2003 | Frank et al. | 717/116 |
| 2003/0202014 A1 | * | 10/2003 | Wood | 345/763 |
| 2005/0125787 A1 | * | 6/2005 | Tertitski et al. | 717/162 |

* cited by examiner

*Primary Examiner* — Phenuel Salomon
(74) *Attorney, Agent, or Firm* — Robert D. Morelli

(57) ABSTRACT

A device and method of determining changes to a graphical user interface (GUI) that does not require the use of a configuration file or the use of data from a previous operation of an application computer program by identifying a program currently running, determining a first tree structure for the GUI, identifying a communication from the program to the GUI, returning to the third step if the communication does not change the GUI, determining a second tree structure for the changed GUI, comparing the first and second tree structures for any change, discarding the first tree structure, renaming the second tree structure as the first tree structure, and transmitting the identified change to a user, and returning to the third step.

8 Claims, 6 Drawing Sheets

DEVICE FOR AND METHOD OF DETERMINING CHANGES TO GUI

FIELD OF INVENTION

The present invention relates, in general, to data processing and, in particular, to operator interface (e.g., graphical user interface).

BACKGROUND OF THE INVENTION

Interfaces to computing devices typically involve typing text in a command line or inputting text or selecting options using a selection device (e.g., a computer mouse) in a graphical image (i.e., a graphical user interface or GUI). A typical GUI is a window on a computer in which an application computer program (e.g., a search engine) is running, where data in the window changes as the application computer program operates (e.g., changes as the user types data into the window or selects boxes via a computer mouse, data retrieved by a search engine is displayed).

A GUI operates in a dynamic environment and could change without the user noticing the change. Since a change in a GUI could be of significance to a user (e.g., a change in Uniform Resource Locator (URL) has occurred), there is a need to identify to a user if and how a GUI has changed. The present invention is a device for and method of determining if and how a GUI has changed.

A prior art method of determining state changes in a GUI includes the following steps. Saving the contents of an application computer program that is running in a GUI (e.g., an application computer program such as a search engine running in a computer window). Monitoring the GUI for events (i.e., communications between the application computer program and the GUI concerning what the application computer program is doing such as receiving a search topic, returning results of a search, etc.) in the GUI, determining if an event would cause the content of the GUI to change (e.g., displaying a search topic, displaying the results of a search). Determining if what the application computer program would like to display in the GUI is supported by the GUI (i.e., could be displayed by the GUI). If the application computer program is supported by the GUI then checking the GUI against a corresponding configuration file to determine if a change has occurred in the GUI. If the application computer program wants to display something in the GUI that is not supported by the GUI (i.e., cannot be displayed by the GUI) then saving the contents of the GUI. If any change in the GUI has been determined then informing the user of the change. The prior art method requires the use of a configuration file. Since the contents of a configuration file might not be current, using such a configuration file might cause a change in the GUI to go undetected. Therefore, there is a need for a device for and method of determining a change to a GUI that does not require the use of a configuration file. The present invention is such a device and method.

U.S. Pat. No. 6,898,764, entitled "METHOD, SYSTEM AND PROGRAM PRODUCT FOR DETERMINING DIFFERENCES BETWEEN AN EXISTING GRAPHICAL USER INTERFACE (GUI) MAPPING FILE AND A CURRENT GUI," discloses a device for and method of comparing a first lists of GUI objects to a second list of GUI objects based on GUI mapping files to determine if an object in the first list is in the second list, and vice versa. U.S. Pat. No. 6,898,764 uses a GUI mapping file that is based on a previous version of the software, which exists before the a subsequent operation of the software. Therefore, U.S. Pat. No. 6,898,764 requires data from a previous operation of a software application. U.S. Pat. No. 6,898,764 is hereby incorporated by reference into the specification of the present invention.

U.S. Pat. No. 7,237,204, entitled "CHANGE DETECTION IN A GRAPHICAL USER INTERFACE," discloses a method of determining if data used to display a graphical user interface has changed that requires the use of a configuration file. U.S. Pat. No. 7,237,204 is hereby incorporated by reference into the specification of the present invention.

SUMMARY OF THE INVENTION

It is an object of the present invention to determine a change in a GUI.

It is another object of the present invention to determine a change in a GUI that does not require the use of a configuration file.

It is another object of the present invention to determine a change in a GUI that does not require the use of a configuration file or the use of data from a previous operation of an application computer program.

The present invention is a device for and method of determining changes to a GUI.

The device includes a first function block, having an input for receiving a GUI in which an application computer program is currently running, and having an output for transmitting what the first function block received and produced.

The device also includes a second function block for determining a first tree structure for the GUI and its content (i.e., its objects) while the application computer program is currently running, having an input connected to the output of the first function block, and having an output for transmitting what the second function block received and produced.

The device also includes a third function block for identifying a communication from the application computer program to the GUI (i.e., an event) while the application computer program is currently running, having a first input connected to the output of the second function block, having a second input, having a third input, and having an output for transmitting what the third function block received and produced.

The device also includes a fourth function block for determining if the communication identified in the third function block does not change the GUI while the application computer program is currently running and, if so, returning operation of the device to the third function block, otherwise transferring operation of the device to a fifth function block, having an input connected to the output of the third function block, and having an output connected to the second input of the third function block for transmitting what the fourth function block received and produced.

The device also includes the fifth function block for determining if the GUI has changed while the application computer program is currently running and, if so, determining a second tree structure for the changed GUI while the application computer program is currently running, having an input connected to the output of the fourth function block, and having an output for transmitting what the fifth function block received and produced.

The device also includes a sixth function block for comparing the first tree structure to the second tree structure and identifying the change there between, having an input connected to the output of the fifth function block, and having an output for transmitting what the sixth function block received and produced.

The device also includes a seventh function block for discarding the first tree structure, having an input connected to the output of the sixth function block, and having an output for transmitting what the seventh function block received and produced.

The device also includes an eighth function block for renaming the second tree structure as the first tree structure, having an input connected to the output of the seventh function block, and having an output for transmitting what the eighth function block received and produced.

The device also includes a ninth function block for transmitting the identified change to a user, and returning operation of the device to the third function block, having an input connected to the output of the eighth function block, and having an output connected to the third input of the third function block for transmitting what the ninth function block received and produced.

The first step of the method is identifying a GUI in which an application computer program is currently running.

The second step of the method is determining a first tree structure for the GUI and its content (i.e., its objects) while the application computer program is currently running.

The third step of the method is identifying a communication from the application computer program to the GUI (i.e., an event) while the application computer program is currently running.

The fourth step of the method is returning to the third step if the communication identified in the third step does not change the GUI while the application computer program is currently running, otherwise proceeding to the fifth step.

The fifth step of the method is determining a second tree structure for the changed GUI while the application computer program is currently running if the GUI has changed while the application computer program is currently running.

The sixth step of the method is comparing the first tree structure to the second tree structure and identifying the change there between.

The seventh step of the method is discarding the first tree structure.

The eighth step of the method is renaming the second tree structure as the first tree structure.

The ninth step of the method is transmitting the identified change to a user, and returning to the third step.

DETAILED DESCRIPTION

The present invention is a device for and method of determining changes to a GUI that does not require the use of a configuration file or the use of data from a previous operation of an application computer program.

Figure 1:
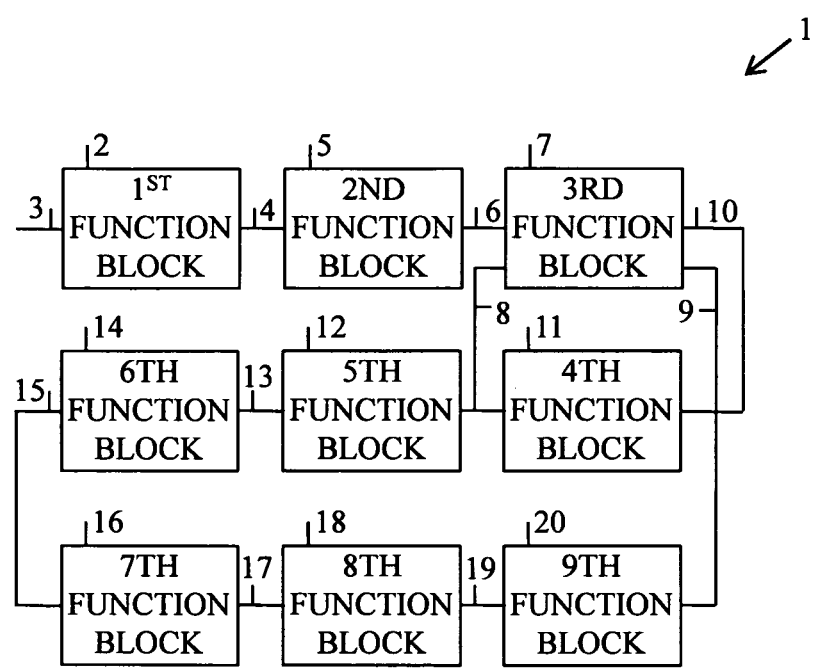
FIG. 1 is a schematic of the device of the present invention.

FIG. 1 is a schematic of the device 1 of the present invention.

The device 1 includes a first function block 2, having an input 3 for receiving a GUI in which an application computer program is currently running, and having an output 4 for transmitting what the first function block 2 received and produced.

The device 1 also includes a second function block 5 for determining a first tree structure for the GUI and its content (i.e., its objects) while the application computer program is currently running, having an input connected to the output 4 of the first function block, and having an output 6 for transmitting what the second function block 5 received and produced. In the preferred embodiment, the first tree structure includes objects contained in the GUI (e.g., structure, name of object, value of object, next object, previous object, list of child objects).

The device 1 also includes a third function block 7 for identifying a communication from the application computer program to the GUI (i.e., an event) while the application computer program is currently running, having a first input connected to the output 6 of the second function block 5, having a second input 8, having a third input 9, and having an output 10 for transmitting what the third function block 7 received and produced.

The device 1 also includes a fourth function block 11 for determining if the communication identified in the third function block 7 does not change the GUI while the application computer program is currently running and, if so, returning operation of the device to the third function block 7, otherwise transferring operation of the device 1 to a fifth function block 12 described below, having an input connected to the output 10 of the third function block 7, and having an output connected to the second input 8 of the third function block 7 for transmitting what the fourth function block 11 received and produced.

The device 1 also includes the fifth function block 12 for determining if the GUI has changed while the application computer program is currently running and, if so, determining a second tree structure for the changed GUI while the application computer program is currently running, having an input connected to the output 8 of the fourth function block 11, and having an output 13 for transmitting what the fifth function block 12 received and produced. In the preferred embodiment, the second tree structure includes the same objects included in the first tree structure (e.g., structure, name of object, value of object, next object, previous object, list of child objects).

The device 1 also includes a sixth function block 14 for comparing the first tree structure to the second tree structure and identifying the change there between, having an input connected to the output 13 of the fifth function block 12, and having an output 15 for transmitting what the sixth function block 14 received and produced.

The device 1 also includes a seventh function block 16 for discarding the first tree structure, having an input connected to the output 15 of the sixth function block 14, and having an output 17 for transmitting what the seventh function block 16 received and produced.

The device 1 also includes an eighth function block 18 for renaming the second tree structure as the first tree structure, having an input connected to the output 17 of the seventh function block 16, and having an output 19 for transmitting what the eighth function block 18 received and produced.

The device 1 also includes a ninth function block 20 for transmitting the identified change to a user, and returning operation of the device to the third function block 7, having an input connected to the output 19 of the eighth function block 18, and having an output connected to the third input 9 of the third function block 7 for transmitting what the ninth function block 20 received and produced.

Figure 2:
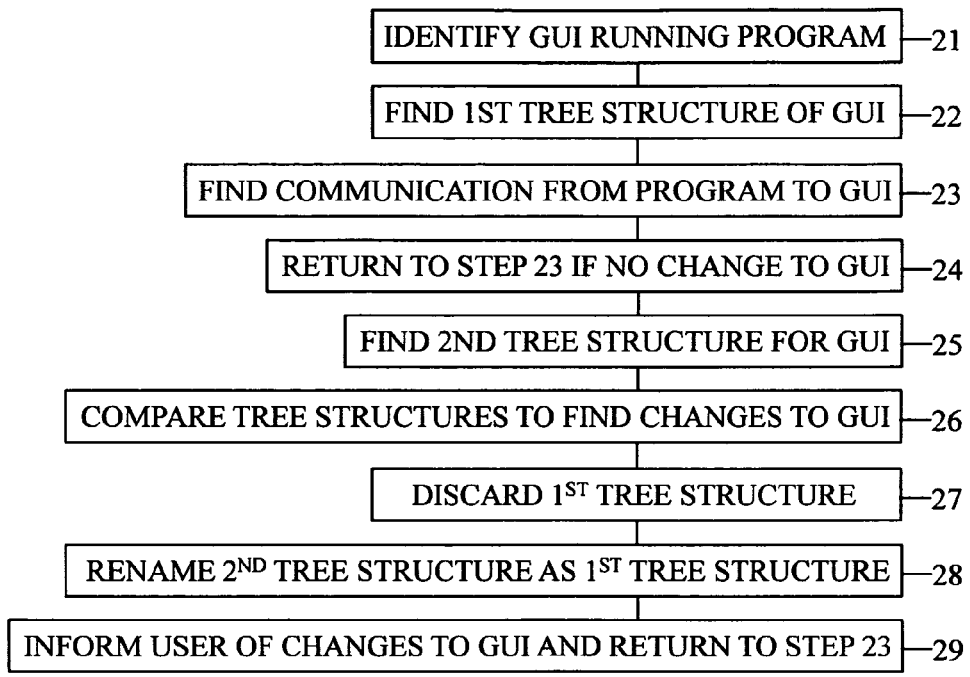
FIG. 2 is a flow-chart of the method of the present invention.

FIG. 2 is a flow-chart of the method of the present invention.

The first step 21 of the method is identifying a GUI in which an application computer program is currently running.

The second step 22 of the method is determining a first tree structure for the GUI and its content (i.e., its objects) while the application computer program is currently running. In the preferred embodiment, the first tree structure includes objects contained in the GUI (e.g., structure, name of object, value of object, next object, previous object, list of child objects).

The third step 23 of the method is identifying a communication from the application computer program to the GUI (i.e., an event) while the application computer program is currently running.

The fourth step 24 of the method is returning to the third step 23 if the communication identified in the third step does not change the GUI while the application computer program is currently running, otherwise proceeding to a fifth step 25 described below.

The fifth step 25 of the method is determining a second tree structure for the changed GUI while the application computer program is currently running if the GUI has changed while the application computer program is currently running. In the preferred embodiment, the second tree structure includes the same objects included in the first tree structure (e.g., structure, name of object, value of object, next object, previous object, list of child objects).

The sixth step 26 of the method is comparing the first tree structure to the second tree structure and identifying the change there between.

The seventh step 27 of the method is discarding the first tree structure.

The eighth step 28 of the method is renaming the second tree structure as the first tree structure.

The ninth step 29 of the method is transmitting the identified change to a user, and returning to the third step 23.

Figure 3:
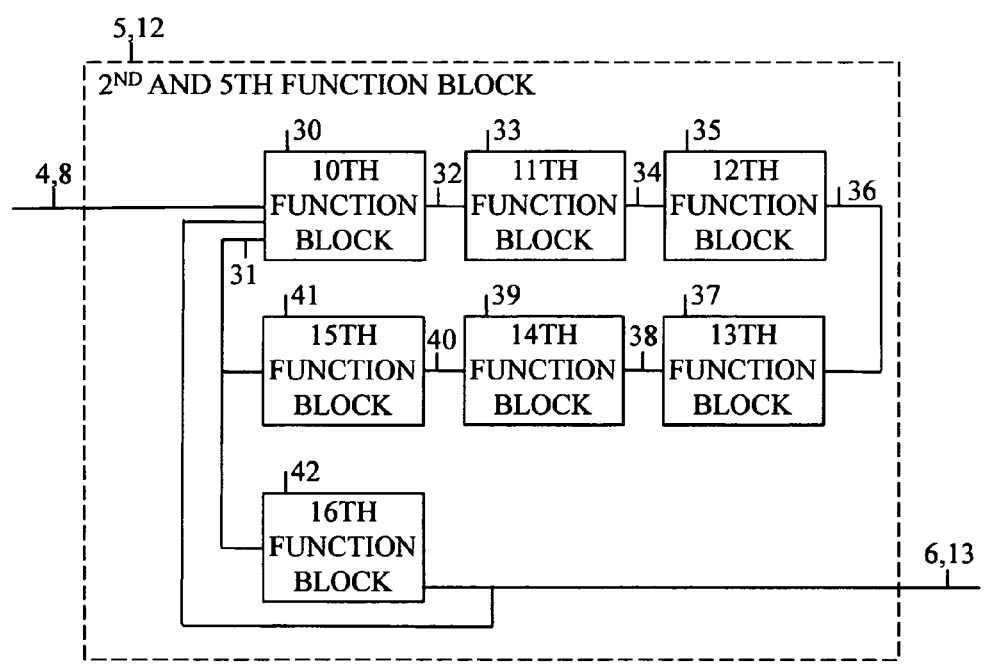
FIG. 3 is a schematic of the preferred second and fifth function blocks of the device of FIG. 1.

FIG. 3 is a schematic of the preferred second and fifth function blocks 5, 12 of FIG. 1. The preferred second and fifth function blocks 5, 12 of FIG. 3 each include a tenth function block 30 for selecting an object at a current level, where the first object selected is the object at a top level, having a first input 4, having a second input 31, having a third input 6,13, and having an output 32 for transmitting what the tenth function block 30 receives and produces. The preferred second and fifth function blocks 5, 12 also include an eleventh function block 33 for determining an amount of objects at the current level, having an input connected to the output 32 of the tenth function block 30, and having an output 34 for transmitting what the eleventh function block 33 receives and produces. The preferred second and fifth function blocks 5, 12 also include a twelfth function block 35 for recording a name and value of the object at the current level, having an input connected to the output 34 of the eleventh function block 33, and having an output 36 for transmitting what the twelfth function block 35 receives and produces. The preferred second and fifth function blocks 5, 12 also include a thirteenth function block 37 for determining if the object at the current level has any children objects, having an input connected to the output 36 of the twelfth function block 35, and having an output 38 for transmitting what the thirteenth function block 37 receives and produces. The preferred second and fifth function blocks 5, 12 also include a fourteenth function block 39 for selecting a children object of the selected object that has not been processed, if any, having an input connected to the output 38 of the thirteenth function block 37, and having an output 40 for transmitting what the fourteenth function block 39 receives and produces. The preferred second and fifth function blocks 5, 12 also include a fifteenth function block 41 for identifying the selected children object as the object at the current level and returning to the tenth function block 30, having an input connected to the output 40 of the fourteenth function block 39, and having an output connected to the second input 31 of the tenth function block 30 for transmitting what the fifteenth function block 41 receives and produces. The preferred second and fifth function blocks 5, 12 also include a sixteenth function block 42 for selecting another object at the top most level and returning to the tenth function block 30 if there are no more children objects to be processed for a particular object, having an input connected to the output 31 of the fifteenth function block 41, and having an output connected to the third input 6, 13 of the tenth function block 30 for transmitting what the sixteenth function block 42 receives and produces, which is also the output of the second and fifth function blocks 5, 12.

Figure 4:
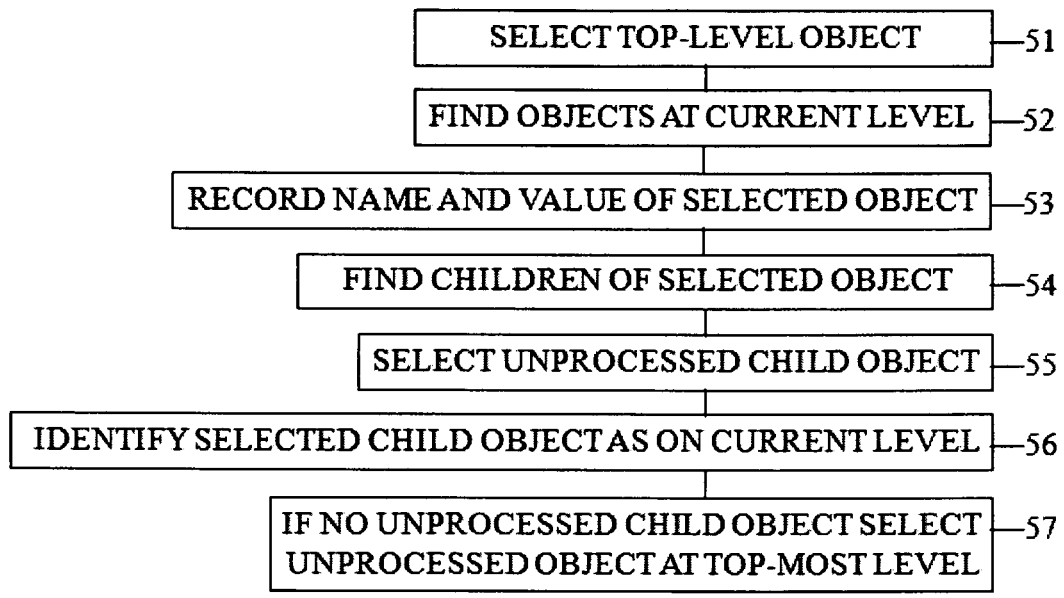
FIG. 4 is a preferred flow-chart for the second and fifth steps of FIG. 2.

FIG. 4 is a flow-chart of the preferred method of the second and fifth steps 22, 25 of the method of FIG. 2. The first step 51 of FIG. 4 is selecting an object at a current level, where the first object selected is the object at a top level. The second step 52 is determining an amount of objects at the current level. The third step 53 is recording a name and value of the object at the current level. The fourth step 54 is determining if the object at the current level has any children objects. The fifth step 55 is if any children objects have not been processed then selecting one of the children objects. The sixth step 56 is identifying the selected children object as the object at the current level, and returning to the first step 51. The seventh step 57 is if there are no more children objects to be processed for a particular object then selecting another object at the top most level and returning to the first step 51.

Figure 5:
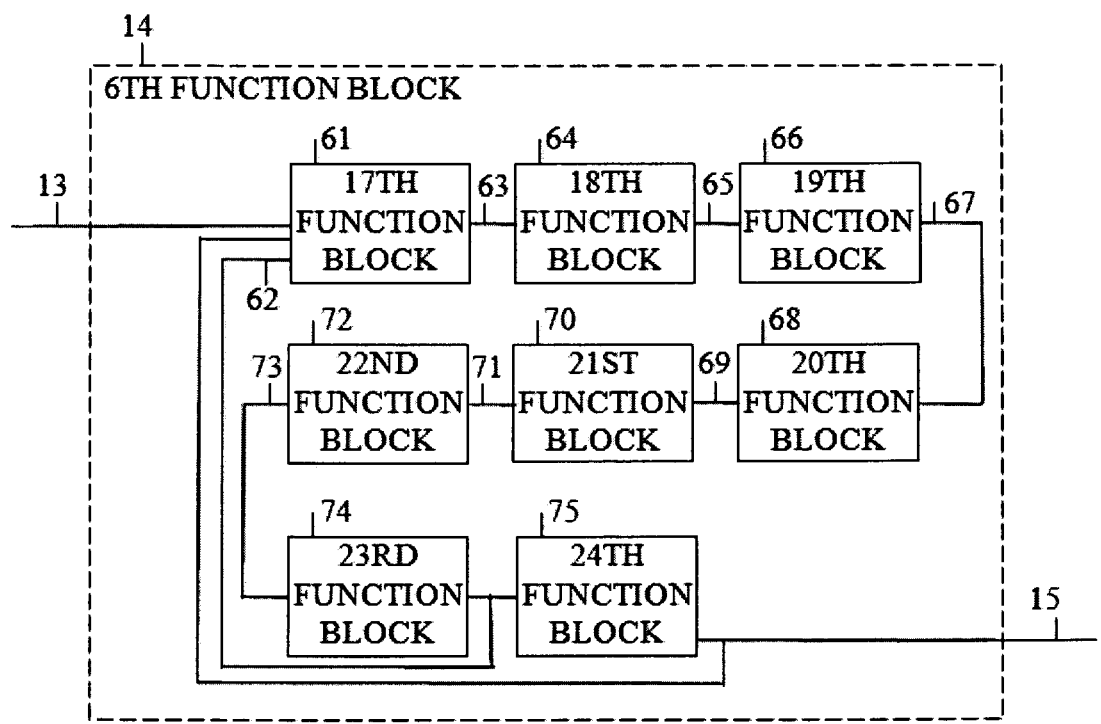
FIG. 5 is a schematic of the preferred sixth function block of FIG. 1.

FIG. 5 is a schematic of the sixth function block 14 of FIG. 1. The sixth function block 14 of FIG. 5 includes a seventeenth function block 61 for receiving the first tree structure and the second tree structure, having a first input 13, having a second input 62, having a third input 15, and having an output 63 for transmitting what the seventeenth function block 61 receives and produces. The sixth function block 14 also includes an eighteenth function block 64 for checking for a structure object in the first tree structure that does not appear in the second tree structure (i.e., checking for a deleted structure), having an input connected to the output 63 of the seventeenth function block 61, and having an output 65 for transmitting what the eighteenth function block 64 receives and produces. The sixth function block 14 also includes a nineteenth function block 66 for checking for a structure object in the second tree structure that does not appear in the first tree structure (i.e., checking for an added structure), having an input connected to the output 65 of the eighteenth function block 64, and having an output 67 for transmitting what the nineteenth function block 66 receives and produces. The sixth function block 14 also includes a twentieth function block 68 for selecting an object that appears in the first tree structure and the second tree structure at a top level, having an input connected to the output 67 of the nineteenth function block 66, and having an output 69 for transmitting what the twentieth function block 68 receives and produces. The sixth function block 14 also includes a twenty-first function block 70 for checking in the selected object a name of object in the first tree structure and the second tree structure for any change there between, having an input connected to the output 69 of the twentieth function block 68, and having an output 71 for transmitting what the twenty-first function block 70 receives and produces. The sixth function block 14 also includes a twenty-second function block 72 for checking in the selected object a value of object in the first tree structure and the second tree structure for any change there between, having an input connected to the output 71 of the twenty-first function block 70, and having an output 73 for transmitting what the twenty-second function block 72 receives and produces. The sixth function block 14 also includes a twenty-third function block 74 for if the selected object has a child object that has not been processed then selecting such a child object and returning to the seventeenth function block 61 otherwise proceeding to the next step, having an input connected to the output 73 of the twenty-second function block 72, and having an output connected to the second input 62 of the seventeenth function block 61 for transmitting what the twenty-third function block 74 receives and produces. The sixth function block 14 also includes a twenty-fourth function block 75 for if there is an object that has not been processed then selecting such an object at the top-most level available and returning to the seventeenth function block 61, having an input connected to the output 62 of the twenty-third function block 74 and having an output connected to the third input 15 of the seventeenth function block 61 for transmitting what the twenty-fourth function block 75 receives and produces, which is also the output 15 of the sixth function block 14.

Figure 6:
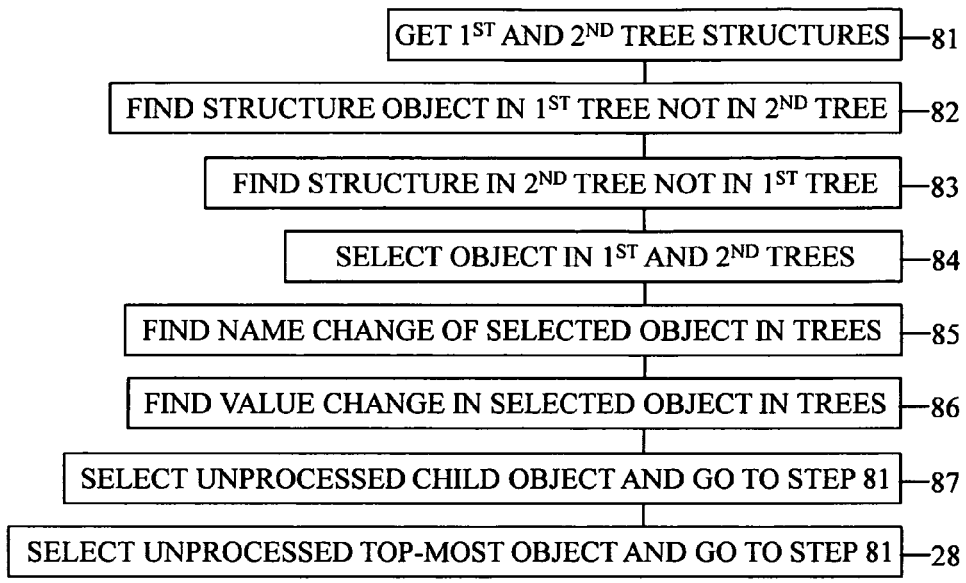
FIG. 6 is a preferred flow-chart for the sixth step of the method of FIG. 2.

FIG. 6 is a flow-chart of the sixth step 26 of FIG. 2. The first step 81 of FIG. 6 is receiving the first tree structure and the second tree structure. The second step 82 is checking for a structure object in the first tree structure that does not appear in the second tree structure (i.e., checking for a deleted structure). The third step 83 is checking for a structure object in the second tree structure that does not appear in the first tree structure (i.e., checking for an added structure). The fourth step 84 is selecting an object that appears in the first tree structure and the second tree structure at a top level. The fifth step 85 is checking in the selected object a name of object in the first tree structure and the second tree structure for any change there between. The sixth step 86 is checking in the selected object a value of object in the first tree structure and the second tree structure for any change there between. The seventh step 87 is if the selected object has a child object that has not been processed then selecting such a child object and returning to the first step 81, otherwise proceeding to the next step. The eighth step 88 is if there is an object that has not been processed then selecting such an object at the top-most level available and returning to the first step 81.

What is claimed is:

1. A device for determining changes to a graphical user interface (GUI) that does not require the use of a configuration file or the use of data from a previous operation of an application computer program, comprising:
   a) a first function block, having an input for receiving a GUI in which an application computer program is currently running, and having an output for transmitting what the first function block received and produced, wherein the first function block is on a user-definable computing device that includes a microprocessor;
   b) a second function block for determining a first tree structure for the GUI and its content while the application computer program is currently running, having an input connected to the output of the first function block, and having an output for transmitting what the second function block received and produced, wherein the second function block is on the user-definable computing device that includes the microprocessor;
   c) a third function block for identifying a communication from the application computer program to the GUI while the application computer program is currently running, having a first input connected to the output of the second function block, having a second input, having a third input, and having an output for transmitting what the third function block received and produced, wherein the third function block is on the user-definable computing device that includes the microprocessor;
   d) a fourth function block for determining if the communication identified in the third function block does not change the GUI while the application computer program is currently running and, if so, returning operation of the device to the third function block, otherwise transferring operation of the device to a fifth function block, having an input connected to the output of the third function block, and having an output connected to the second input of the third function block for transmitting what the fourth function block received and produced, wherein the fourth function block is on the user-definable computing device that includes the microprocessor;
   e) the fifth function block for determining if the GUI has changed while the application computer program is currently running and, if so, determining a second tree structure for the changed GUI while the application computer program is currently running, having an input connected to the output of the fourth function block, and having an output for transmitting what the fifth function block received and produced, wherein the fifth function block is on the user-definable computing device that includes the microprocessor;
   f) a sixth function block for comparing the first tree structure to the second tree structure and identifying a change there between, having an input connected to the output of the fifth function block, and having an output for transmitting what the sixth function block received and produced, wherein the sixth function block is on the user-definable computing device that includes the microprocessor;
   g) a seventh function block for discarding the first tree structure, having an input connected to the output of the sixth function block, and having an output for transmitting what the seventh function block received and produced, wherein the seventh function block is on the user-definable computing device that includes the microprocessor, and where the sixth function block is comprised of:
   a. a seventeenth function block for receiving the first tree structure and the second tree structure, having a first input, having a second input, having a third input, and having an output for transmitting what the seventeenth function block receives and produces, wherein the seventeenth function block is on the user-definable computing device that includes the microprocessor;
   b. an eighteenth function block for checking for a structure object in the first tree structure that does not appear in the second tree structure, having an input connected to the output of the seventeenth function block, and having an output for transmitting what the eighteenth function block receives and produces, wherein the eighteenth function block is on the user-definable computing device that includes the microprocessor;
   c. a nineteenth function block for checking for a structure object in the second tree structure that does not appear in the first tree structure, having an input connected to the output of the eighteenth function block, and having an output for transmitting what the nineteenth function block receives and produces, wherein the nineteenth function block is on the user-definable computing device that includes the microprocessor;

d. a twentieth function block for selecting an object that appears in the first tree structure and the second tree structure at a top level, having an input connected to the output of the nineteenth function block, and having an output for transmitting what the twentieth function block receives and produces, wherein the twentieth function block is on the user-definable computing device that includes the microprocessor;

e. a twenty-first function block for checking in the selected object a name of an object in the first tree structure and the second tree structure for any change there between, having an input connected to the output of the twentieth function block, and having an output for transmitting what the twenty-first function block receives and produces, wherein the twenty-first function block is on the user-definable computing device that includes the microprocessor;

f. a twenty-second function block for checking in the selected object a value of an object in the first tree structure and the second tree structure for any change there between, having an input connected to the output of the twenty-first function block, and having an output for transmitting what the twenty-second function block receives and produces, wherein the twenty-second function block is on the user-definable computing device that includes the microprocessor;

g. a twenty-third function block for selecting a child object if the selected object has a child object and returning to the seventeenth function block, otherwise proceeding to the next step, having an input connected to the output of the twenty-second function block, and having an output connected to the second input of the seventeenth function block for transmitting what the twenty-third function block receives and produces, wherein the twenty-third function block is on the user-definable computing device that includes the microprocessor; and h. a twenty-fourth function block for selecting an object at a top-most level available that has not been selected and returning to the seventeenth function block, having an input connected to the output of the twenty-third function block, and having an output connected to the third input of the seventeenth function block for transmitting what the twenty-fourth function block receives and produces, wherein the twenty-fourth function block is on the user-definable computing device that includes the microprocessor;

h) an eighth function block for renaming the second tree structure as the first tree structure, having an input connected to the output of the seventh function block, and having an output for transmitting what the eighth function block received and produced, wherein the eighth function block is on the user-definable computing device that includes the microprocessor; and i) a ninth function block for transmitting the identified change to a user, and returning operation of the device to the third function block, having an input connected to the output of the eighth function block, and having an output connected to the third input of the third function block for transmitting what the ninth function block received and produced, wherein the ninth function block is on the user-definable computing device that includes the microprocessor.

2. The device of claim 1, wherein said second function block and said fifth function block each include a function block for determining a tree structure for the GUI and its content while the application computer program is currently running, having an input connected to the output of the first function block, and having an output for transmitting what the function block received and produced, wherein the included function block is on the user-definable computing device that includes the microprocessor, wherein the resulting tree structure includes objects selected from the group of objects consisting of structure, name of object, value of object, next object, previous object, list of child objects, and any combination thereof.

3. The device of claim 2, wherein said second function block and said fifth function block each are comprised of:

a) a tenth function block for selecting an object at a current level, where the first object is the object at the top level, having a first input, having a second input, having a third input, and having an output for transmitting what the tenth function block receives and produces, wherein the tenth function block is on the user-definable computing device that includes the microprocessor;

b) an eleventh function block for determining an amount of objects at the current level, having an input connected to the output of the tenth function block, and having an output for transmitting what the eleventh function block receives and produces, wherein the eleventh function block is on the user-definable computing device that includes the microprocessor;

c) a twelfth function block for recording a name and value of the object at the current level, having an input connected to the output of the eleventh function block, and having an output for transmitting what the twelfth function block receives and produces, wherein the twelfth function block is on the user-definable computing device that includes the microprocessor;

d) a thirteenth function block for determining if the object at the current level has any child objects, having an input connected to the output of the twelfth function block, and having an output for transmitting what the thirteenth function block receives and produces, wherein the thirteenth function block is on the user-definable computing device that includes the microprocessor;

e) a fourteenth function block for selecting a child object of the selected object that has not been processed, if any, having an input connected to the output of the thirteenth function block, and having an output for transmitting what the fourteenth function block receives and produces, wherein the fourteenth function block is on the user-definable computing device that includes the microprocessor;

f) a fifteenth function block for identifying a selected child object as the object at the current level and returning to the tenth function block, having an input connected to the output of the fourteenth function block, and having an output connected to the second input of the tenth function block for transmitting what the fifteenth function block receives and produces, wherein the fifteenth function block is on the user-definable computing device that includes the microprocessor; and g) a sixteenth function block for selecting another object at the top most level and returning to the tenth function block if there are no more child objects to be processed for a particular object, having an input connected to the output of the fifteenth function block, and having an output connected to the third input of the tenth function block for transmitting what the sixteenth function block receives and produces, wherein the sixteenth function block is on the user-definable computing device that includes the microprocessor.

4. The device of claim 1, wherein said second function block and said fifth function block each are comprised of:
  a. a tenth function block for selecting an object at a current level, where the first object selected is the object at the top level, having a first input, having a second input, having a third input, and having an output for transmitting what the tenth function block receives and produces, wherein the tenth function block is on the user-definable computing device that includes the microprocessor;
  b. an eleventh function block for determining an amount of objects at the current level, having an input connected to the output of the tenth function block, and having an output for transmitting what the eleventh function block receives and produces, wherein the eleventh function block is on the user-definable computing device that includes the microprocessor;
  c. a twelfth function block for recording a name and value of the object at the current level, having an input connected to the output of the eleventh function block, and having an output for transmitting what the twelfth function block receives and produces, wherein the twelfth function block is on the user-definable computing device that includes the microprocessor;
  d. a thirteenth function block for determining if the object at the current level has any child objects, having an input connected to the output of the twelfth function block, and having an output for transmitting what the thirteenth function block receives and produces, wherein the thirteenth function block is on the user-definable computing device that includes the microprocessor;
  e. a fourteenth function block for selecting a child object that has not been processed, if any, having an input connected to the output of the thirteenth function block, and having an output for transmitting what the fourteenth function block receives and produces, wherein the fourteenth function block is on the user-definable computing device that includes the microprocessor;
  f. a fifteenth function block for identifying the selected child object as the object at the current level and returning to the tenth function block, having an input connected to the output of the fourteenth function block, and having an output connected to the second input of the tenth function block for transmitting what the fifteenth function block receives and produces, wherein the fifteenth function block is on the user-definable computing device that includes the microprocessor; and
  g. a sixteenth function block for selecting another object at the top most level and returning to the tenth function block if there are no more child objects to be processed for a particular object, having an input connected to the output of the fifteenth function block, and having an output connected to the third input of the tenth function block for transmitting what the sixteenth function block receives and produces, wherein the eleventh function block is on the user-definable computing device that includes the microprocessor.

5. A method of determining changes to a graphical user interface (GUI) that does not require the use of a configuration file or the use of data from a previous operation of an application computer program, comprising the steps of:
  a) identifying on a computing device a GUI in which an application computer program is currently running, wherein the computing device includes a microprocessor;
  b) determining on the computing device a first tree structure for the GUI and its content while the application computer program is currently running;
  c) identifying on the computing device a communication from the application computer program to the GUI while the application computer program is currently running;
  d) returning on the computing device to step c) if the communication identified in step c) does not change the GUI while the application computer program is currently running, otherwise proceeding to step (e);
  e) determining on the computing device a second tree structure for the changed GUI while the application computer program is currently running if the GUI has changed while the application computer program is currently running;
  f. a. receiving on the computing device the first tree structure and the second tree structure;
    b. checking on the computing device for a structure object in the first tree structure that does not appear in the second tree structure;
    c. checking on the computing device for a structure object in the second tree structure that does not appear in the first tree structure;
    d. selecting on the computing device an object that appears in the first tree structure and the second tree structure at a top level;
    e. checking on the computing device in the selected object a name of an object in the first tree structure and the second tree structure for any change there between;
    f. checking on the computing device in the selected object a value of an object in the first tree structure and the second tree structure for any change there between;
    g. if the selected object has a child object that has not been processed then selecting on the computing device such a child object and returning to step (a), otherwise proceeding to step (h); and
    h. If there is an object that has not been processed then selecting on the computing device such an object at the top-most level available and returning to step (a);
  g) discarding on the computing device the first tree structure;
  h) renaming on the computing device the second tree structure as the first tree structure; and
  i) transmitting on the computing device the identified change to a user, and returning to step (c).

6. The method of claim 5, wherein the steps of determining a first tree structure and second tree structure for the GUI and its content while the application computer program is currently running are each comprised of the step of determining on the computing device a tree structure for the GUI and its content while the application computer program is currently running, wherein the tree structure includes objects selected from the group of objects consisting of structure, name of object, value of object, next object, previous object, list of child objects, and any combination thereof.

7. The method of claim 6, wherein the steps of determining a first tree structure and a second tree structure are each comprised of the steps of:
  a) selecting on the computing device an object at a current level, where the first object selected is the object at the top level;
  b) determining on the computing device an amount of objects at the current level;
  c) recording on the computing device a name and value of the object at the current level;

d) determining on the computing device if the object at the current level has any child objects;
e) if any child object has not been processed then selecting on the computing device one of the child objects;
f) identifying on the computing device the selected child object as the object at the current level and returning to step (a); and
g) if there are no more child objects to be processed for a particular object then selecting on the computing device another object at the top most level and returning to the first step (a).

8. The method of claim 5, wherein the steps of determining a first tree structure and a second tree structure are comprised of the steps of:
 a. selecting on the computing device an object at a current level, wherein the first object selected is the object at the top level;
 b. determining on the computing device an amount of objects at the current level;
 c. recording on the computing device a name and value of the object at the current level;
 d. determining on the computing device if the object at the current level has any child objects;
 e. if any child object has not been processed then selecting on the computing device one of the child objects;
 f. identifying on the computing device the selected child object as the object at the current level, and returning to step (a); and
 g. if there are no more child objects to be processed for a particular object then selecting on the computing device another object at the top most level and returning to the first step (a).

\* \* \* \* \*